June 3, 1930.                H. M. SHINER                1,761,688
                             CHAIN FASTENER
                           Filed May 18, 1929
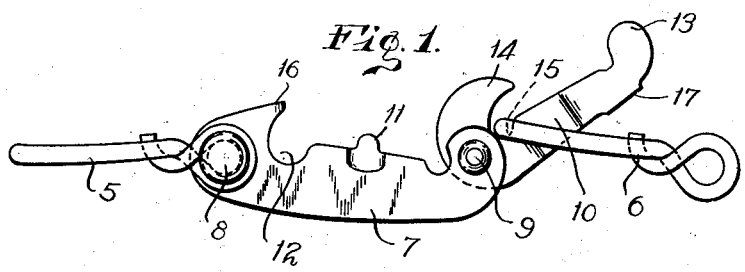
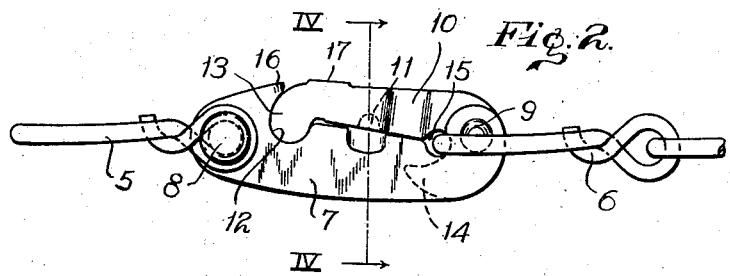
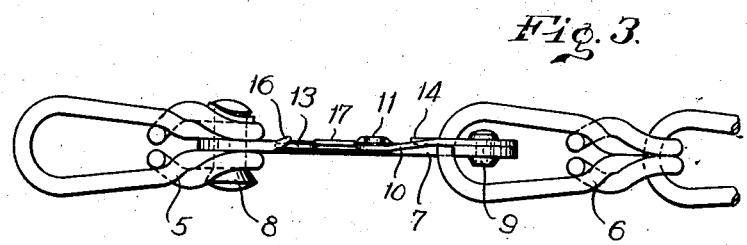
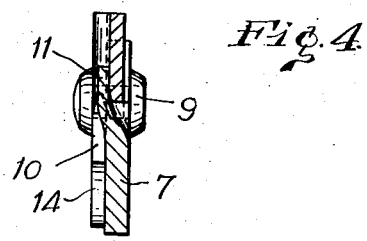
INVENTOR
Harry M. Shiner,
By Archworth Martin,
   Attorney.

Patented June 3, 1930

1,761,688

UNITED STATES PATENT OFFICE

HARRY M. SHINER, OF YORK, PENNSYLVANIA, ASSIGNOR TO UNITED STATES CHAIN & FORGING COMPANY, OF PITTSBURGH, PENNSYLVANIA, A CORPORATION OF DELAWARE

CHAIN FASTENER

Application filed May 18, 1929. Serial No. 364,186.

My invention relates to chain fasteners, and more particularly to tightening and connecting devices such as are employed in fastening the side chains of anti-skid chain structures that are employed on automobile wheels, but it is capable of use in various other relations.

One object of my invention is to provide a fastener that is less likely to become accidentally disconnected than various types heretofore employed, and which may nevertheless be conveniently operated to open and close the same.

Still another object of my invention is to provide a fastening device of generally simplified and improved form.

One form which my invention may take is shown in the accompanying drawing, wherein Figure 1 is a side elevational view of the fastening device in open position; Fig. 2 is a view showing the same in closed position; Fig. 3 is a plan view of the structure of Fig. 2, and Fig. 4 is an enlarged sectional view taken on the line IV—IV of Fig. 2.

The links 5 and 6 represent the end links of an automobile side chain or similar device that are connected. A connector bar 7 has its forward end permanently joined to the link 5 by means of a rivet or pin 8. At its rear end the bar 7 carries a pin or rivet 9 which pivotally supports a latch lever 10.

A tongue 11 that serves as a stop member is formed upon the upper edge of the connecter bar 7 and is offset in a lateral direction relative to the body portion of the connecter bar. At its forward end, the bar 7 is provided with a curved recess 12 for receiving and retaining the curved nose portion 13 of the latch lever 10, when the latch lever is closed. Near its rear end the bar is provided with a semi-circular recess which serves as a seat for the link 6.

The lever 10 is provided with a tail portion 14 and with a curved recess 15 that serves as a seat for the link 6 when the link is being moved into engagement with the connector bar 7, to the tail piece 14 of the lever serving to force the link from its seat in the connecter bar when the lever is swung from the position of Fig. 2 to the position shown in Fig. 1.

When it is desired to connect the links 5 and 6, the link 6 is brought to the position shown in Fig. 1, whereupon the lever 10 is swung in a counter-clockwise direction to carry the link 6 to the position shown in Fig. 2. As the lever approaches its closed position, its nose portion 13 will engage the laterally bent portion 16 of the bar 7, which deflects the lever laterally and permitting the nose 13 to be moved into lateral alinement with the recess 12. The inherent resiliency of the lever 10 will cause its nose portion 13 to snap into position within the recess 12 and its mid portion to bear against the stop 11.

It will be seen that the lever 10 cannot be swung to open position until it has been sprung laterally, in a direction away from the stop 11, and for such distance that the nose portion 13 will be moved clear of the recess 12. A lip or flange 17 is formed on the upper edge of the lever to facilitate manipulation thereof.

I claim as my invention:—

1. A chain fastener comprising a connecter bar having means at its forward end for connection to a chain link and provided in one edge with a curved recess having an overhanging portion, and a latching lever pivotally mounted on the rear end of the said bar and having a nose portion adapted to fit within the said recess and beneath the said overhanging portion when the lever is in closed position, the nose portion of said lever normally occupying the same plane as said overhanging portion, but being laterally yieldable to permit movement into and out of said recess in lateral directions.

2. A chain fastener comprising a connecter bar having means at its forward end for connection to a chain link and provided with an overhanging portion adjacent to its forward end and in the plane of its body portion, and a latching lever pivotally connected to the rear end of the bar and having a nose portion normally lying in the plane of said overhanging portion, the latch lever being laterally yieldable to permit movement thereof into and out of position beneath the said overhanging portion.

3. A chain fastener comprising a connecter bar having means at its forward end for connection to a chain link and provided with an overhanging portion adjacent to its forward end, and a latch lever pivotally connected to one side of the connecter bar but having a nose portion that is laterally deflected in position to normally occupy the same plane as said connecter bar, the lever being yieldable to permit lateral movements thereof into and out of position beneath the overhanging portion.

4. A chain fastener comprising a connecter bar having means at its forward end for connection to a chain link and provided with an overhanging portion adjacent to its forward end and in the plane of its body portion, a stop member on the connecter bar at a point intermediate the ends thereof, a latch lever pivotally connected to the rear end of the bar and against one side thereof in substantially the vertical plane of said stop, the mid portion of said lever being deflected laterally to permit movement thereof past the stop and lying in the plane of the mid portion of the connecter bar, and a nose portion on the forward end of said lever positioned for movement to and from beneath the said overhanging portion through lateral deflections of the said nose portion.

5. A chain fastener comprising a connecter bar having means at its forward end for connection to a chain link, and provided with an overhanging portion adjacent to its forward end and in the plane of its body portion, and a latch lever pivotally connected to one side of the connecter bar but having a nose portion that is laterally deflected in position to normally occupy the same plane as said overhanging portion, the lever being yieldable to permit lateral movements thereof into and out of position beneath the overhanging portion, and the said overhanging portion being provided with a laterally-deflected camming surface for deflecting the lever laterally during its movement to closed position, to permit it to spring into position beneath said overhanging portion when completely closed.

6. A chain fastener comprising a connecter bar having means at its forward end for connection to a chain link and provided with an overhanging portion adjacent to its forward end, a latch lever pivotally connected to one side of the connecter bar but having a nose portion that is laterally deflected in position to normally occupy the same plane as the connecter bar, the lever being yieldable to permit lateral movements thereof into and out of position beneath the overhanging portion, and camming means for deflecting the said nose portion laterally when the lever is being moved to closed position, to permit it to spring into position beneath said overhanging portion when completely closed.

7. A chain fastener comprising a connecter bar having a cut-out portion in one edge thereof, and an extension above said cut-out portion, a latch lever pivotally connected to said bar at a point removed from said cut-out portion, and a projection on said lever normally occupying the plane of the cut-out portion, the lever being laterally yieldable in order to permit it to be laterally deflected and moved into position beneath said extension.

In testimony whereof I, the said HARRY M. SHINER, have hereunto set my hand.

HARRY M. SHINER.